(12) United States Patent
Coyle et al.

(10) Patent No.: US 7,285,585 B2
(45) Date of Patent: Oct. 23, 2007

(54) COAGULATION OF PARTICLES FROM EMULSIONS BY THE INSITU FORMATION OF A COAGULATING AGENT

(75) Inventors: Robert William Coyle, Warrington, PA (US); Morris Christopher Wills, Philadelphia, PA (US)

(73) Assignee: Rohm and Haas Company, Philadelphia, PA (US)

( * ) Notice: Subject to any disclaimer, the term of this patent is extended or adjusted under 35 U.S.C. 154(b) by 222 days.

(21) Appl. No.: 10/637,449

(22) Filed: Aug. 8, 2003

(65) Prior Publication Data

US 2004/0039110 A1 Feb. 26, 2004

Related U.S. Application Data

(60) Provisional application No. 60/406,025, filed on Aug. 26, 2002.

(51) Int. Cl.

| C08J 3/02 | (2006.01) |
|---|---|
| C08L 27/12 | (2006.01) |
| C08L 67/00 | (2006.01) |
| C08K 3/20 | (2006.01) |
| C09D 5/02 | (2006.01) |

(52) U.S. Cl. ............ 523/335; 524/501; 524/543; 524/544; 524/545; 524/546; 524/555; 524/556; 524/600; 524/601; 524/602; 524/612

(58) Field of Classification Search ........... 523/335; 524/501

See application file for complete search history.

(56) References Cited

U.S. PATENT DOCUMENTS

| 2,023,296 A | 12/1935 | Trobridge | |
| 2,494,002 A * | 1/1950 | Rumbold | 523/335 |
| 3,793,402 A | 2/1974 | Owens | |
| 5,221,713 A * | 6/1993 | Kempner et al. | 525/71 |
| 5,312,575 A * | 5/1994 | Wills | 264/109 |

FOREIGN PATENT DOCUMENTS

| DE | 1155531 A | 6/1969 |
| EP | 1101775 | 5/2001 |

* cited by examiner

*Primary Examiner*—Patrick Niland
(74) *Attorney, Agent, or Firm*—Richard R Clikeman

(57) ABSTRACT

This invention provides processes for isolating particles from an emulsion including the steps of: (a) forming an emulsion having a solid component having a population of particles, a liquid component, and a first ionic forming compound, wherein the presence of the first ionic forming compound in the emulsion does not result in the coagulation of the population of particles contained therein; (b) obtaining a composition having a second ionic forming compound which, by itself, is not sufficient to result in the coagulation of the population of particles contained in the emulsion; and (c) mixing the emulsion and the composition having the second ionic compound such that the first ionic forming compound reacts with the second ionic forming compound to form a coagulating agent which results in the coagulation of the population of particles. The invention also provides processes for preparing a polymer matrix system using the aforementioned process for isolating particles from an emulsion. In these processes, the plastic matrix system is prepared by adding, to a plastic resin, the emulsion and the composition having the second ionic forming compound, such that the first ionic forming compound reacts with the second ionic forming compound to form a coagulating agent which results in the coagulation of the population of particles.

11 Claims, No Drawings

COAGULATION OF PARTICLES FROM EMULSIONS BY THE INSITU FORMATION OF A COAGULATING AGENT

CROSS REFERENCE TO RELATED PATENT APPLICATIONS

This is a non-provisional application of now abandoned pending U.S. provisional application Ser. No. 60/406,025 filed Aug. 26, 2002.

The present invention relates to particulate compositions made in an emulsion process. These particulate compositions can be polymeric compounds which are useful in improving the properties and processability of plastic resins. The present invention also pertains to processes for preparing such particulate compositions, as well as processes for preparing plastic matrixes containing the same.

It has been known for many decades that plastic resins often do not possess the physical or processing characteristics necessary to make them commercially viable. Accordingly, compositions are often added to enhance the plastics' characteristics.

The performance and process enhancing compounds used in the plastics industry (hereinafter "plastic additives") are typically polymeric. These plastic additives can be made by a number of different ways. One common example is by emulsion polymerization. In this process, the polymeric additive particles are formed, separated from the liquid phase, dried, and processed into a powder. The powder is then blended with a plastic resin whose properties need to be enhanced.

Since many plastic additives are used while in a powder form, one significant limitation upon the development of new additives is their ability to form a stable powder. The term "stable" as it pertains to powders means the ability of the individual powder particles to remain a flowable form during normal storage, handling and processing procedures.

One reason for the difficulty in developing a stable plastic additive powder is that many of the additives are relatively soft. Thus, they have the tendency to stick together which reduces the powder's stability. This phenomenon is often seen in plastic additives designed to enhance the impact resistance of plastic resin systems (hereinafter "impact modifiers") since, in order to impart this property, the additive generally needs to be soft and rubbery.

One way in which the plastic additives industry addresses this problem is by the use of multi-layered plastic additive systems. Such systems are typically known in the industry as "core/shell" systems. In most core/shell plastic additive systems, the inner stage (i.e., the core) is relatively soft and rubbery; and the outer stage (i.e., the shell) is relatively hard and rigid. The hardness of the shell keeps the particles from sticking together.

There are two common ways in which solid plastic additives are isolated from an emulsion. One approach is to coagulate the additive out of the emulsion, filter the resulting slurry to separate polymer from the bulk of the aqueous phase, and then dry the resulting wet cake to form a powder (hereinafter a "coagulation process"). A typical example of such a process is one where a latex containing the plastic additive is coagulated by adding a coagulating agent, such as calcium chloride, to the latex. The slurry is then filtered to isolate the polymer. Thereafter, the polymer is washed, dried, and (if necessary) milled into a powder with a desirable size distribution. Specific examples of conventional coagulation processes include: freeze-coagulation, salt-coagulation, and methanol-coagulation.

An example of a conventional coagulation process is disclosed in EP 1,101,775. According to that application, a process is disclosed for preparing polymeric particulates via emulsion polymerization, and then coagulating the particles out of the emulsion by the addition of an electrolyte. This process can create localized coagulated masses which later have to be crushed.

Notwithstanding the widespread commercial use of powdery plastic additives, there are significant production costs associated therewith due to their respective isolation steps. The plastic additives industry and the plastic manufacturing industry would greatly welcome processes to produce plastic additives which significantly reduce production costs without reducing the additives' performance properties.

Accordingly, one object of this invention is to provide a novel process for producing particles from an emulsion.

Another object of this invention is to provide a novel process for producing particles useful as plastic additives in a manner which significantly reduces production costs of the particles without reducing their performance properties.

Still another object of this invention provides a novel process for preparing a plastic matrix system comprising plastic additives.

These and other objects will be apparent to those skilled in the art after reading the specification and appended claims.

This invention provides novel processes for isolating particles from an emulsion. One embodiment of processes encompassed by the present invention include the steps of:

(a) forming an emulsion having a solid component comprising a population of particles, a liquid component, and a first ionic forming compound, wherein the presence of the first ionic forming compound in the emulsion does not result in the coagulation of the population of particles contained therein;

(b) obtaining a composition comprising a second ionic forming compound which, by itself, is not sufficient to result in the coagulation of the population of particles contained in the emulsion; and (c) mixing the emulsion and the composition comprising the second ionic compound such that the first ionic forming compound reacts with the second ionic forming compound to form a coagulating agent which results in the coagulation of the population of particles.

In another embodiment of the processes for isolating particles from an emulsion, the composition comprising the second ionic forming compound ion is an emulsion having a solid component comprising a second population of particles, a liquid component, and the second ionic forming compound. In this embodiment, the presence of the second ionic forming compound does not result in the coagulation of the population of particles contained therein.

This invention also provides novel processes for preparing plastic matrix resin systems comprising particles. One embodiment of processes encompassed by the present invention include the steps of:

(a) forming an emulsion having a solid component comprising a population of particles, a liquid component, and a first ionic forming compound, wherein the presence of the first ionic forming compound in the emulsion does not result in the coagulation of the population of particles contained therein;

(b) obtaining a composition comprising a second ionic forming compound which, by itself, is not sufficient to result in the coagulation of the population of particles contained in the emulsion; and (c) forming a plastic matrix system by blending, a plastic resin, the emulsion and the composition comprising the second ionic forming compound, such that the first ionic forming compound reacts with the second ionic forming compound to form a coagulating agent which results in the coagulation of the population of particles.

In another embodiment of the processes for preparing plastic matrix resin systems comprising particles, the composition comprising the second ionic forming compound ion is an emulsion having a solid component comprising a second population of particles, a liquid component, and the second ionic forming compound. In this embodiment, the presence of the second ionic forming compound does not result in the coagulation of the population of particles contained therein.

The term "rubbery" used herein denotes the thermodynamic state of a polymer above its glass transition temperature.

The term "units derived from" used herein refers to polymer molecules that are synthesized according to known polymerization techniques wherein a polymer contains "units derived from" its constituent monomers.

The term "molecular weight" used herein refers to the weight average molecular weight of polymer molecules as determined by the gel permeation chromatography method.

The term "alkyl (meth)acrylate" used herein refers to both alkyl acrylate and alkyl methacrylate monomer compounds.

The term "stage" used herein is intended to encompass its broadest possible meaning, including the meaning conveyed in prior art such as in U.S. Pat. No. 3,793,402 which offers various means for achieving "staged" polymers.

The term "parts" used herein is intended to mean "parts by weight". Unless otherwise stated, "total parts by weight" do not necessarily add to 100.

The term "weight percent" used herein is intended to mean "parts per hundred by weight" wherein the total parts add to 100.

The term "particle size" used herein refers to the mean particle diameter of a population of particles.

The term "high solids" used herein refers to an emulsion having a solids concentration of at least 30 weight percent of the total emulsion.

One embodiment of this invention provides novel processes for isolating particles from an emulsion. In one embodiment, these processes includes the steps of forming at least one emulsion. It is, however, within the scope of this invention for two or more emulsions to be used. Regardless of the number of emulsions used when practicing this invention, there must be at least one that contains an ionic forming compound which (a) does not result in the coagulation of the population(s) of particles contained within the emulsion, but (b) does react with a second ionic forming compound to form a coagulating agent which results in the coagulation of the population(s) of particles.

Accordingly, in one embodiment of practicing this invention, a first and a second emulsion are formed, each having a solid component comprising at least one population of particles, a liquid component comprising water, and an ionic forming compound that may be present in the emulsion's solid component, liquid component, or both. As stated above, the composition and strength of the ionic forming compounds present in the individual emulsions are such that they: (a) do not result in the coagulation of the population(s) of particles contained within any given emulsion, but (b) do react with each other to form a coagulating agent which results in the coagulation of the population(s) of the particles contained within the first and second emulsions when the two emulsions are blended together.

In this embodiment, the first and second ionic forming compounds must be different. The term "different" as it refers to first and second ionic forming compounds encompasses differences in compositions, concentrations, or strengths.

The populations of particles contained within the given emulsions may also be the same or different. The term "different" as it refers to the populations of particles encompasses differences in particle size distributions, compositions, concentrations, or any combination thereof.

In another embodiment of the present invention for isolating particles from an emulsion, a single emulsion is formed. This emulsion has a solid component comprising at least one population of particles, a liquid component comprising water, and an ionic forming compound that may be present in the emulsion's solid component, liquid component, or both. As stated above, the composition and strength of the ionic forming compounds present in the emulsion are such that they: (a) do not result in the coagulation of the population(s) of particles contained within the emulsion, but (b) do react with a second ionic forming compound to form a coagulating agent which results in the coagulation of the population(s) of the particles contained within the emulsion.

In this embodiment, the first and second ionic forming compounds can be the same or different. The term "different" as it refers to first and second ionic forming compounds encompasses differences in compositions, concentrations, or strengths.

After reading this specification, those skilled in the art will be able to select the appropriate composition, concentration and strength of the first and second ionic forming compounds which best suits their specific needs. In many instances, the composition of ionic forming compounds which can be used when practicing this invention include: acids, bases, water miscible solvents, and salt solutions.

The coagulation of the particles in accordance with the present invention results from the in situ formation of a coagulating agent. For example, where the emulsifier is a sulfate and sulfonate, this can be accomplished by the coagulating agent being a salt, such as sodium chloride, and calcium chloride. However, if the emulsion is stabilized with a soap having carboxylic acid groups, this can be accomplished by the coagulating agent being an appropriate acid.

In one specific embodiment of this invention, the first emulsion contains an acid (i.e., the first ionic forming composition) and the second emulsion contains a base (i.e., the second ionic forming composition). Then, when the emulsions are blended together, a salt (i.e., the coagulating agent) is formed in situ. The acid and base may be present in their respective emulsions as concentrated solutions of the same. If an acid and base are used as the first and second ionic forming composition, it is typically preferred that they be water soluble. It is also typically preferred that resulting salt be water soluble.

In another specific embodiment of this invention, an emulsion contains an acid (i.e., the first ionic forming composition) and the composition comprising the second ionic forming compound contains a base. Then, when the emulsion is blended with the composition comprising the second ionic forming compound, a salt (i.e., the coagulating agent) is formed in situ. The acid and base may be present in as concentrated solutions of the same. If an acid and base are used as the first and second ionic forming composition, it is typically preferred that they be water soluble. It is also typically preferred that resulting salt be water soluble.

Suitable bases that can be used when practicing this invention include: ammonia, low molecular weight amines such as monomethyl amine. The preferred base depends upon the specific composition of the emulsions, and the process, handling and storage conditions to which they are subjected. In instances where the emulsion comprises a high solids impact modifier, ammonia is one example of a preferred base.

A combination coagulant system comprised of ammonia and acetic acid is particularly desirable in some cases, because the resulting ammonium acetate salt will decompose and become volatile at elevated temperatures. It is possible to conceive of a number of ways in which this phenomenon can be exploited to cause evaporation of the components of the combined coagulant salt. One possible approach would be to provide an extruder with a devolatilization zone in which heat is applied to evaporate residual water, ammonia and acetic acid, thus leaving a final solid polymer which is effectively salt-free.

Suitable acids that can be used when practicing this invention include: carbon dioxide, sulfur dioxide, acetic acid, formic acid, and propionic acid. The preferred acid depends upon the specific composition of the emulsions, and the process, handling and storage conditions to which they are subjected. In instances where the emulsion comprises a high solids impact modifier, acetic acid is one example of a preferred acid.

The proper selection of the individual ionic forming compounds depends, in part, upon the method of coagulation. Often times, the method of coagulation will depend upon the type of surfactant present in the separate emulsions. Surfactants may be chosen from a variety known to the emulsion art, such as alkali metal or ammonium salts of long-chain alkylsulfonic acids, long-chain alkylsulfates, derivatives of aromatic sulfonates, and ethoxylated alkaryl phosphates. Specific examples of surfactants that can be used to make emulsions employed when practicing this invention include: sodium lauryl sulfate, sodium dodecylbenzene sulfonate, potassium dodecylbenzene sulfonate, lauryl(ethoxy)sulfates and sulfonates, lauryl(polyethoxy) sulfates and sulfonates, alkaryl(polyethoxy)sulfates and sulfonates, cetyltrimethylammonium chloride, and TRITON™×100 having the structure:

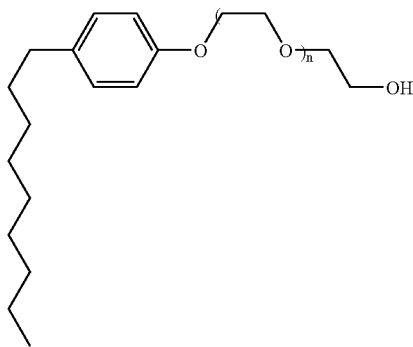

Anionic surfactants are often preferred. In those instances, the adsorbed anion produces a negatively charged surface surrounded by an electrical double layer. The mechanism of salt coagulation is compression of the electrical double layer on the particle surface by the coagulant's ions. The effectiveness of the salt is especially determined by the type and charge of the cation. Cation efficiencies for compressing double layers, and their respective threshold salt concentrations, are as follows:

$$Al^{3+} >> Ca^{2+} \sim Mg^{2+} >> Na^{1+} \sim K^{1+} \sim NH_4^+ < 0.1 \text{ wt. \%} \quad 0.1 \text{ to 1 wt. \%} \quad 3 \text{ to 5 wt. \%}$$

Preferred examples of coagulating agents that are formed in situ when practicing this invention include: NaCl, ammonium salts, $MgSO_4$, and $CaCl_2$.

Depending upon the solids concentrations of the individual emulsions, the liquid content of the coagulated mass will vary. Since drying processes are costly, it is often preferred for the liquid content of the coagulated mass to be minimized. When cost reduction is preferred, the concentration of liquid in the coagulated mass typically less than 70 weight percent, or less than 50 weight percent, or less than 30 weight percent.

One way of achieving low liquid content in the coagulated mass produced in accordance with the present invention is for the first and second emulsions to have high solids concentrations of the polymeric particles contained therein. Typically, the solids concentration of the first and second emulsions is at least 15 weight percent. However, in one preferred embodiment, the solids concentration of the first and second emulsions is at least 30 weight percent, or at least 45 percent, or at least 60 percent.

After the coagulated mass is formed, it is dried. Any conventional method can be used for drying.

After isolation, the particulate compound may be mixed with an appropriate matrix polymer at levels to obtain the desired improvement. If the property sought to be improved is the resin's impact resistance, and the isolated particles are impact modifiers, the particles are generally added at a level of 1 to 30 percent by weight of the final plastic matrix system, and typically at a level of 5 to 20 percent by weight of the final plastic matrix system.

When compared to conventional coagulation processes, the process of the present invention has many cost advantages. For example, in conventional coagulation processes, it is recommended that the solids concentrations of the slurry that results from addition of the coagulating agent be below 20 weight percent. The reason for this is that, at higher concentrations, the slurry becomes very viscous and it is difficult to thoroughly mix the coagulating agent and the emulsion. Poor mixing of the coagulating agent and the emulsion can result in incomplete coagulation of the emulsion, which results in reduced yield of the final product and wastewater containing unacceptably high amounts of polymer. In the present invention, however, this problem solved since coagulation occurs at a controlled pace as the coagulating agent is being formed in situ and the coagulating agent and emulsion can be thoroughly mixed before coagulation begins. Therefore, since conventional coagulation processes have higher liquid concentrations in their resulting coagulated mass, the drying cost associated therewith is also higher.

When high solids emulsions are used to practice this invention, additional cost savings can be achieved by using an extruder or a heated multi-roll mill (hereinafter individually and collectively referred to as an "extruder") as the drying mechanism. For example, most extruders can be set up to handle liquid feed streams. Thus, the first and second emulsions can easily be fed into the extruder. Once in the body of the extruder, the coagulating agent is formed which results in the formation of a coagulated mass. While the mass is mixed in the extruder, heat is applied. This heat drives off most liquids. The mass is then extruded through a die. The extruded product can then be cut into pellets or crushed into a powder.

Emulsions that can be used when practicing this invention can be made by a number of different ways known to those skilled in the art. For illustrative purposes, this invention will be described in detail where an emulsion is formed having a solids portion which comprises a core/shell impact modifier for poly(vinyl halide) resin systems. After reading the following description, those skilled in the art will understand that the scope of the invention encompasses other different processes for forming emulsions.

In this embodiment of the invention, an emulsion having a solids portion which comprises a core/shell impact modifier for poly(vinyl halide) resin systems is formed by emulsion polymerization a latex of rubbery polymer particles having a glass transition temperature below 0° C., and typically below −20° C. It is within the scope of this embodiment of the invention for there to be: (a) only one population of rubbery polymer particles having an average particle size (hereinafter referred to as a "unimodal system"), or (b) two or more populations of rubbery polymer particles, each having its own distinct average particle size, its own distinct particle composition, or it own distinct particle size and polymer composition (hereinafter singly and collectively referred to as a "multimodal system").

When practicing this embodiment of the invention, if the solids component of the formed emulsion is a unimodal system, the average particle size must be at least 150 nm. Similarly, if the solids component of the formed emulsion is a multimodal system wherein the differences of the populations is only their composition (i.e., the average particle size of both populations is essentially the same), the average particle size of both populations must be at least 150 nm. Finally, if the solids component of the formed emulsion is a multimodal system wherein the differences of the populations is at least their average particle size (i.e., the they may be compositionally the same or different), the average particle size of the smaller population must be at least 50 nm, and the average particle size of the larger population must be at least 200 nm. Specifically, in instances where the solids component of the emulsion is a multimodal system wherein the differences of the populations is at least their average particle size, the total average particle size of the sum of the populations must be at least 150 nm.

Therefore, in accordance with this embodiment of the invention, regardless of whether the solids component of the formed emulsion is a unimodal or a multimodal system, the total average particle size of the sum of the populations must be at least 150 nm. It is within the scope of this embodiment of the invention for the total average particle size of the sum of the populations must be at least 200, or at least 250 nm, or at least 300 nm.

When practicing this embodiment of the invention, the emulsion has a solids component concentration of at least 20 weight percent. It is within the scope of this embodiment for the solids component concentration of the emulsion to be at least 40 weight percent; or at least 60 weight percent. On the other hand, the emulsion has a solids component concentration of at most 90 weight percent. It is within the scope of this embodiment of the invention for the solids component concentration of the emulsion to be at most 80 weight percent; or at most 70 weight percent. All of these weight percentages are based upon the total weight of the emulsion.

Also when practicing this embodiment of the invention, the emulsion has a liquids component concentration of at most 80 weight percent. It is within the scope of this embodiment for the liquids component concentration of the emulsion to be at most 60 weight percent; or at most 40 weight percent. On the other hand, the emulsion used when practicing this embodiment has a liquids component concentration of at least 10 weight percent. It is within the scope of this invention for the liquids component concentration of the emulsion to be at least 20 weight percent; or at least 30 weight percent. All of these weight percentages are based upon the total weight of the emulsion.

The composition of the rubbery polymer particles in the solids portion of the emulsion used when practicing this embodiment of the invention depends upon the specific plastic matrix system which is being modified, and the desires end results of the modified plastic matrix system. Continuing the illustrative example set out above, this invention will be described in detail where the solids portion of the emulsion is a core/shell impact modifier.

The core portion of the impact modifiers present in the solids portion of the emulsion used when practicing this embodiment of the invention makes up at least 60 weight percent of the core/shell particle. The core portion of these impact modifiers generally have units derived from one or more of the following: butadiene; and $C_2$ to $C_8$ lower alkyl acrylate(s) such as ethyl acrylate, butyl acrylate, hexyl acrylate, octyl acrylate or 2-ethylhexyl acrylate. Thus, the presence of core/shell impact modifiers which have core portions comprising copolymers of butadiene and an alkyl acrylate(s), in any ratio, are encompassed by this embodiment of the invention. However, other monomers, such as isoprene, vinyl acetate, vinyl versatate, styrene, acidic monomers (e.g., methacrylic acid), alkyl methacrylates (e.g., 2-ethylhexyl methacrylate), and isobutylene, may be present in the core portion of the impact modifiers that can be used when practicing this embodiment of the invention.

The core portion also typically contains units derived from at least one multi-unsaturated monomer. If present, the concentration of such units ranges from 0.05 weight percent to 5 weight percent of the total weight of the core portion. The multi-unsaturated monomer may be one in which the unsaturated groups are similar and of equal reactivity, such as in divinyl benzene, divinyl adipate, ethylene glycol dimethacrylate, butylene glycol diacrylate, and trimethylolpropane trimethacrylate. On the other hand, the multi-unsaturated monomer may be one in which the unsaturated groups are dissimilar and of unequal reactivity, such as in diallyl maleate, allyl methacrylate, and allyl acrylate.

The weight percent of the impact modifier's core portion used when practicing this embodiment of the invention depends upon the desired end use of the resulting plastic resin system. Those skilled in the art will be able to determine the preferred percentage for their particular purpose after reading this specification. In certain circumstances, there are benefits of using higher core concentrations. In those instances, the impact modifier's core portion used when practicing this embodiment of the invention is typically at least 70 weight percent, or at least 80 weight percent, or at least 90 weight percent. On the other hand, the impact modifier's core portion used when practicing this embodiment of the invention is typically at most 99 weight percent, or at most 99 weight percent, or at most 98 weight percent. All of these weight percentages are based upon the total average weight of the core/shell impact modifier. It is, however, within the scope of this invention for the polymeric particle to be 100 weight percent of a core portion (i.e., there is essentially no shell).

The core/shell impact modifiers present in the emulsion used when practicing this specific embodiment of the invention has a shell portion which is typically at least 1 weight percent, or at least 2 weight percent, or at least 3 weight percent of the particle's total weight. On the other hand, the impact modifier's shell portion used when practicing this specific embodiment of the invention is typically at most 40 weight percent, or at most 30 weight percent, or at most 20 weight percent, or at most 10 weight percent of the particle's total weight.

The shell portion of the impact modifiers that can be present when practicing this specific embodiment of the invention is typically comprised of a hard polymer or co-polymer having a glass transition temperature of at least 20° C. In one preferred example, the shell portion is formed from at least 50 weight percent of units derived from methyl methacrylate.

In this specific example, the shell portion may be a homopolymer of methyl methacrylate, a copolymer of methyl methacrylate with a small amount of an alkyl acrylate or an alkyl methacrylate, such as ethyl methacrylate or butyl acrylate, a copolymer of methyl methacrylate with styrene, and a copolymer of methyl methacrylate with methacrylic acid. The final shell portion may be partially or totally attached to or grafted to the core portion.

In this specific embodiment, the molecular weight of the shell polymer is relatively high. In most instances, the molecular weight is greater than 100,000. However, molecular weights of the shell polymer can be very high, such as 1,000,000 and above.

In some instances, the core/shell polymer has an intermediate layer interposed between the core polymer and the shell polymer (hereinafter referred to as the "intermediate shell"). If present in such a core/shell polymer, the intermediate shell can also be comprised of units derived from methyl methacrylate.

In such circumstances, at least 50 weight percent of the intermediate shell is comprised of methyl methacrylate. It is within the scope of this embodiment of the invention for an intermediate shell to be comprised essentially of methyl methacrylate. Thus, the intermediate shell may also be a homopolymer of methyl methacrylate, a copolymer of methyl methacrylate with a small amount, such as from about 1 to about 20 parts of an alkyl acrylate or an alkyl methacrylate, such as ethyl methacrylate or butyl acrylate, a copolymer of methyl methacrylate with styrene, and a copolymer of methyl methacrylate with methacrylic acid.

When present, the intermediate shell is typically at least 2 weight percent of the core/shell polymeric particle. It is within the scope of this embodiment of the invention for the intermediate shell to be at least 5 weight percent of the core/shell polymeric particle, or at least 7 weight percent of the core/shell polymeric particle. On the other hand, when present, the intermediate shell is typically at most 25 weight percent of the core/shell polymeric particle. It is within the scope of this embodiment of the invention for the intermediate shell to be at most 20 weight percent of the core/shell polymeric particle, or at most 15 weight percent of the core/shell polymeric particle. The preferred weight percentage depends upon the desired end use.

The intermediate shell polymer may be partially or totally attached to or grafted to the core polymer. It may further contain from about 0.05 weight percent to about 5 weight percent of one or more multi-unsaturated monomers, as defined above.

The ratio of core to intermediate shell is as defined to ensure that the highest impact efficiency can be achieved whilst leaving a shell to act as a compatibilizing layer between the rubbery polymer and the matrix polymer. The use of a low level of intermediate shell means that the intermediate core/shell polymer will not have a particle size much larger than the original core particle.

In this specific embodiment, the reaction conditions for formation of both the intermediate and final shells are those under which essentially no new polymer particles are formed. These conditions are well known, and generally relate to avoiding formation of new polymer particles in separate soap-stabilized micelles. Normally, little or no new emulsifier is added, and the soap concentration is maintained below the critical micelle concentration, which is known or can be determined for most emulsifiers. Further, the use of highly water-soluble monomers is avoided, to avoid formation of separate particles. However, if the polymer is water insoluble, then water soluble monomers can be used.

It is impossible to define the specific conditions for each emulsion polymerization since every process is different. However, a common rule that can be used when determining the ideal conditions is to test the further polymerization on a small scale by adding no additional emulsifier to a system already low in emulsifier; if the emulsion remains stable, then a larger reaction may be conducted.

The reaction conditions by which the polymerization process is run to form the emulsions used when practicing this invention include those which are known in the art. The initiators employed are those common to emulsion polymerization, such as persulfates, peresters, hydroperoxides, peracids, and azo compounds. Some or all of the initiators may be combined with activators to form "redox" pairs. Such activators include sodium formaldehyde sulfoxylate, sodium metabisulfite, and sodium hydrosulfite.

The polymerization processes may be conducted by batch processes (monomer all present in the kettle), by addition of a series of "shots", or by gradual addition. A seed polymer may be separately made and added to control particle size, or the seed may be generated in situ. The monomers may be added "neat", as pre-formed emulsions, or by use of an in-line emulsifier while being added to the reactor.

Another embodiment of this invention relates to novel processes for preparing plastic matrix systems containing polymeric particles. These processes includes the steps of forming at lease two separate emulsions as set out above wherein each has a solid component comprising polymeric particles a liquid component comprising water and an ionic forming compound that may be present in the emulsion's solid or liquid component. Here, after the emulsions are prepared, a plastic matrix system is formed by adding to a plastic resin the first emulsion and the second emulsion. As stated above, upon mixing, the ionic compounds from the individual emulsions react to form a new ionic compound which causes the coagulation of the polymeric particles. In this instance, the formation of the coagulated mass occurs while in the presence of a plastic resin. Thereafter, the plastic matrix system is dried.

The processes of making plastic matrix resins in accordance with this embodiment of the invention essentially eliminates one of the largest production costs associated with the preparation of polymeric particles used as plastic additives—drying. For example, the plastic resin, and the individual emulsions can be added directly to an extruder. As stated above, the extruder mixes the emulsions which results in the formation of a coagulated mass. But, unlike above, this occurs in the presence of a plastic resin which is also in the extruder. Thus, as the coagulated mass is being formed and dried, it is also being blended with the plastic resin to form a plastic matrix system. This is then extruded into the desired shape.

When practicing this embodiment of the invention, any plastic resin whose properties need enhanced can be used. One example of a family of plastic resins which needs performance and process enhancing compounds added thereto is poly(vinyl halides). Common examples of poly(vinyl halides) include: poly(vinyl chloride) ("PVC"), chlorinated poly(vinyl chloride) ("CPVC"), poly(vinyl fluoride) ("PVF"), and poly(vinylidene fluoride) ("PVDF"). Examples also include homopolymers or copolymers of vinyl chloride, homopolymers or copolymers of methyl methacrylate, or engineering resins, such as polyesters of terephthalic acid and an aliphatic glycol, polyamides, polycarbonates, polyglutarimides, acrylonitrile-butadiene-styrene resins, or blends of at least two of such resins.

If desired, stabilizers may be added to the polymer particles prior to isolation, during isolation, after isolation or any combination thereof. For use in engineering resins where higher processing temperatures are encountered, thermal stabilizers such as triaryl phosphites, non-volatile hindered phenols, and organosulfur compounds, such as long-chain mercaptoesters may be added. If the rubbery particles contain above about 25 weight percent of butadiene, one or more stabilizers, such as hindered phenols, are conventionally added prior to isolation.

In this embodiment, the resulting polymeric matrix system may further contain one or more of the following: lubricant, processing aid, rheology modifier, dye, pigment, flame retardant, thermal stabilizer, antioxidant, antiozonant, ultraviolet stabilizer, mold release agent, reinforcing filler or non-reinforcing filler. If present, the reinforcing filler may be least one of the following: glass fibers, glass spheres, talc, or mica. In the case of a PVC polymer matrix system made in accordance with this invention, the matrix system may also contain a heat distortion improver, such as a polyglutarimide.

The PVC and CPVC polymer matrix systems prepared in accordance with the present invention can be used for all applications where conventional PVC and CPVC polymer matrix systems are already employed, such as production of extruded, injection molded, blow-molded and foamed articles of commerce, such as siding, especially for architectural uses, window shades, protective shading, window profiles, pipe and drainage uses, appliance housings, refrigerator liners and trays, bottles for packaging of liquids and solids, such as potable water, and food oils, and for many other conventional uses.

The engineering resin polymer matrix systems prepared in accordance with the present invention, such as polyesters of terephthalic acid and an aliphatic glycol, polyamides, polycarbonates, polyglutarimides, acrylonitrile-butadiene-styrene resins, or blends of at least two of such resins, can be used for all applications where conventional engineering resins are already employed, such as appliance housings, automotive parts, food packaging, such as trays, and bottles, furniture, and other well-known uses.

Blends with methyl methacrylate polymer matrix systems prepared in accordance with the present invention, can be used for all applications where conventional methyl methacrylate polymer matrix systems are already employed, such as capstock, translucent or transparent glazing, molded articles, such as cups, and taillights.

The following examples illustrate this invention.

EXAMPLE 1

All of the water in the recipe is deionized (DI). Heated water (1145 parts), at 88° C. was charge to a 5 gallon stainless steel reactor fitted with an agitator. The stirring rate was set to 160 RPM. The reactor was sparged with nitrogen gas at a rate of 640 mL/minute for 15 minutes. Then, the nitrogen was changed to a sweep at 240 mL/minute.

Acetic acid (2 parts) was then added. The first seed latex polymer (215 parts total latex at 45% polymer in water), and then the second seed latex polymer (1606 parts total latex at 54% polymer in water) were added to the reactor. The latex particle sizes of the first and second seed latexes were 100 and 330 nm, respectively, t-Butyl peroxide (t-BHP) initiator (5 parts of 70% t-BHP dissolved in 45 parts of water), and sodium formaldehyde sulfoxylate (SFS) activator (5 parts of 78% SFS dissolved in 115 parts of water) were then added to the reactor.

The polymerization was commenced by starting three simultaneous feeds to the reactor. The feed time for all three feeds was 120 minutes. One of the feeds was an emulsified monomer mixture (EMM, 9639 parts total, consisting of 7335 parts of butyl acrylate (BA), 52 parts of allyl methacrylate (ALMA), 284 parts of 28% sodium lauryl sulfate (SLS) in water, and 1968 parts of water). One of the other feeds was a t-BHP initiator solution (2 parts of 70% t-BHP in 210 parts water). The other feed was an SFS solution (4 parts of 78% SFS dissolved in 208 parts of water). The flow rate for the EMM was 80 parts/minute. The flow rates for the other feeds (SFS and t-BHP) were 2 parts/minute.

The reactor jacket heating and cooling was manipulated so the reaction temperature was maintained at 85° C. The mixing profile in the reactor during the feeds was as follows. After 30 minutes of feeds set to 175 RPM, after 60 minutes of feeds set to 195 RPM, and after 90 minutes of feeds set to 215 RPM. At the end of the feeds, the EMM feed line was rinsed with 148 parts of water to the reactor and an additive of SLS, 406 parts total of 28% SLS in water and 41 parts of DI water rinse was added batch-wise to the reactor. The chase tBHP (2 parts of 70% t-BHP in 71 parts water), and the chase SFS (2 parts of 78% SFS dissolved in 71 parts of water), were added to the reactor as 30 minute feeds, each at a rate of 2 parts/minute. At the end of this stage the sample was sampled for percent total solids. The actual solids were 60%.

The second stage polymerization was carried out by first lowering the reaction temperature to 52° C. and increasing agitation to 235 RPM. The methyl methacrylate (MMA) monomer was added as a neat batch-wise charge (1834 parts MMA, followed by a 92 parts water rinse). The stage II sodium persulfate (NaPS, 2 parts in 61 parts water) and the stage II SFS (2 parts of 78% SFS dissolved in 61 parts of water), were added to the reactor separately as 30 minute feeds each at a rate of 2 parts/minute. The stage II chase t-BHP (1 part of 70% t-BHP in 43 parts water) and the chase SFS (1 part of 78% SFS dissolved in 43 parts of DI water), were added to the reactor as 30 minute feeds each at a rate of 1 part/minute. At the end of this stage the reactor mixture was cooled to 40° C. and filtered through cheesecloth into a 5 gallon pail. Negligible coagulum was observed on the cheesecloth.

The final sample was sampled for percent total solids. The actual solids were 63%. The final viscosity as measured by a Brookfield viscometer using a number 3 spindle at 30 RPM was 390 centipoise. The latex particle size was measured by capillary flow fractionation. The latex particle size was bimodal. The small mode was 270 nm and the large mode was 590 run. The weight fractions of the small and large modes were in the ratio of 30/70 (small/large).

EXAMPLE 2

Weak Acid emulsion, Part A: 1000 parts of the 63% solids latex sample from Example 1 were added to a 2000 mL beaker fitted with an agitator stirring at 100 RPM. 30 parts of neat acetic acid were added drop-wise to the latex. The total solids were now 62%.

Weak Base emulsion Part B: 1000 parts of the 63% solids latex sample from Example 1 were added to a 2000 mL beaker fitted with an agitator stirring at 100 RPM. 29 parts of 29% ammonia in water were added drop-wise to the latex. The total solids were now 62%.

EXAMPLE 3

100 parts of the weak acid latex, Part A of Example 2, were mixed in a beaker with 100 parts of the weak base latex, Part B of Example 2 at 25° C. The mixture instantly coagulated to a moist powder with a coagulated particle size of about 100-300 microns. No residual latex or free water was observed.

Based on the reaction of the ammonia with the acetic acid the total percentage of ammonium acetate in the mixture was 2%. The solids level of the wet-cake was measure gravimetrically to be 62%.

The wet-cake product was dried in a vacuum oven at 70° C. and 0.1 atmospheres for 24 hours. 122 parts of dry powder product were recovered.

EXAMPLE 4

500 parts of the weak acid latex, Part A of Example 2, and 500 parts of the weak base latex, Part B of Example 2, were fed simultaneously to the hopper of a twin screw extruder at flow rates of 60 parts/minute. The temperature of the extruder apparatus was 25° C.

The latex mixtures blended and then coagulated in the screw zone of the extruder. At the outlet of the extruder a moist powder emerged with a coagulated particle size of about 100-300 microns. No residual latex or free water was observed. The solids level of the wet-cake was measure gravimetrically to be 62%.

That which is claimed is:

1. A process for isolating particles from an emulsion, comprising the steps of:
   (a) providing a first emulsion having a solid component comprising a population of first particles, a liquid component, and a first ionic forming compound, wherein the first ionic forming compound is present in the first emulsion at a concentration that is less than the concentration required to cause coagulation of the first particles contained in the first emulsion;
   (b) providing a second emulsion having a solid component comprising a population of second particles, a liquid component, and a second ionic forming compound, wherein the second ionic forming compound is present in the second emulsion at a concentration that is less than the concentration required to cause coagulation of the second particles contained in the second emulsion;
   (c) mixing the first emulsion and the second emulsion to form an emulsion mixture such that the first ionic forming compound reacts with the second ionic forming compound to form a coagulating agent; and
   (d) coagulating the first particles and the second particles, wherein:
   the first ionic forming compound and the second ionic forming compound are reactive with one another to form a coagulating agent; and
   the first ionic forming compound and the second ionic forming compound are, respectively, present in the first emulsion and the second emulsion at a concentration sufficient to form the coagulating agent at a concentration in the emulsion mixture sufficient to coagulate the first particles and the second particles.

2. The process of claim 1, wherein:
   the first ionic forming compound is an acid; and
   the second ionic forming compound is a base.

3. The process of claim 2, wherein the acid is selected from carbon dioxide, sulfur dioxide, acetic acid, formic acid, propionic acid, or combinations thereof.

4. The process of claim 2, wherein the base is selected from ammonia, low molecular weight amine, and combinations thereof.

5. The process of claim 4, wherein the low molecular weight amine is monomethyl amine.

6. The process of claim 1, wherein at least one of the first particles and the second particles comprises an impact modifier, wherein the impact modifier comprises a rubbery polymer.

7. The process of claim 1, wherein at least one of the first emulsion and the second emulsion is formed by using at least one of the following as a surfactant: sodium lauryl sulfate, sodium dodecylbenzene sulfonate, potassium dodecylbenzene sulfonate, lauryl(ethoxy)sulfates and sulfonates, lauryl(polyethoxy)sulfates and sulfonates, alkaryl(polyethoxy)sulfates and sulfonates, and cetyltrimethylammonium chloride.

8. The process of claim 1, comprising the further steps of:
   providing a plastic resin; and
   combining the plastic resin with at least one of the first emulsion and the second emulsion before or during the step of mixing; and
   wherein the step of coagulating further comprises forming a plastic matrix system.

9. The process of claim 8, comprising the further step of: drying the plastic matrix system.

10. The process of claim 8, wherein the plastic resin is selected from poly(vinyl chloride), chlorinated poly(vinyl chloride), poly(vinyl fluoride), poly(vinylidene fluoride), copolymers of vinyl chloride, homopolymers of methyl methacrylate, copolymers of methyl methacrylate, polyesters, polyamides, polycarbonates, polyglutarimides, acrylonitrile-butadiene-styrene resins, or blends thereof.

11. The process of claim 8, wherein the plastic resin comprises a poly(vinyl halide).

* * * * *